United States Patent [19]

Leonhartsberger

[11] Patent Number: 5,332,385
[45] Date of Patent: Jul. 26, 1994

[54] INJECTION MOLDING MACHINE INCLUDING LATERALLY DISPLACEABLE PISTON

[75] Inventor: Heinz Leonhartsberger, Schwertberg, Austria

[73] Assignee: Engel Maschinenbau Gesellschaft m.b.H., Schwertberg, Austria

[21] Appl. No.: 33,758

[22] Filed: Mar. 18, 1993

[30] Foreign Application Priority Data

Mar. 24, 1992 [AT] Austria ............................ A 599/92

[51] Int. Cl.⁵ ............................................ B29C 45/64
[52] U.S. Cl. ............................ 425/589; 100/258 A; 425/450.1; 425/595
[58] Field of Search ............ 425/589, 590, 595, 450.1, 425/451, 451.2, 451.9, 409; 100/258 A

[56] References Cited

U.S. PATENT DOCUMENTS

| | | |
|---|---|---|
| 1,476,765 | 12/1923 | Murray, Jr. et al. ............... 425/590 |
| 4,776,783 | 10/1988 | Pelle et al. ......................... 425/590 |
| 5,249,951 | 10/1993 | Leonhartsberger et al. ....... 425/589 |

FOREIGN PATENT DOCUMENTS

| | | |
|---|---|---|
| 0311133 | 4/1991 | European Pat. Off. . |
| 2048258 | 10/1972 | Fed. Rep. of Germany . |
| 2321694 | 11/1974 | Fed. Rep. of Germany . |
| 3132949 | 3/1983 | Fed. Rep. of Germany . |

*Primary Examiner*—Jay H. Woo
*Assistant Examiner*—James P. Mackey
*Attorney, Agent, or Firm*—Wenderoth, Lind & Ponack

[57] ABSTRACT

An injection molding machine includes a machine frame, stationary and movable mold fixing plates and a cylinder plate carrying at lest one piston-cylinder unit. The cylinder plate and the stationary mold fixing plate are not connected as usual by beam members, but are connected exclusively by way of the machine frame. A piston of the piston-cylinder unit is rigidly connected to the movable mold fixing plate and is pivotable relative to a cylinder of the piston-cylinder unit.

3 Claims, 1 Drawing Sheet

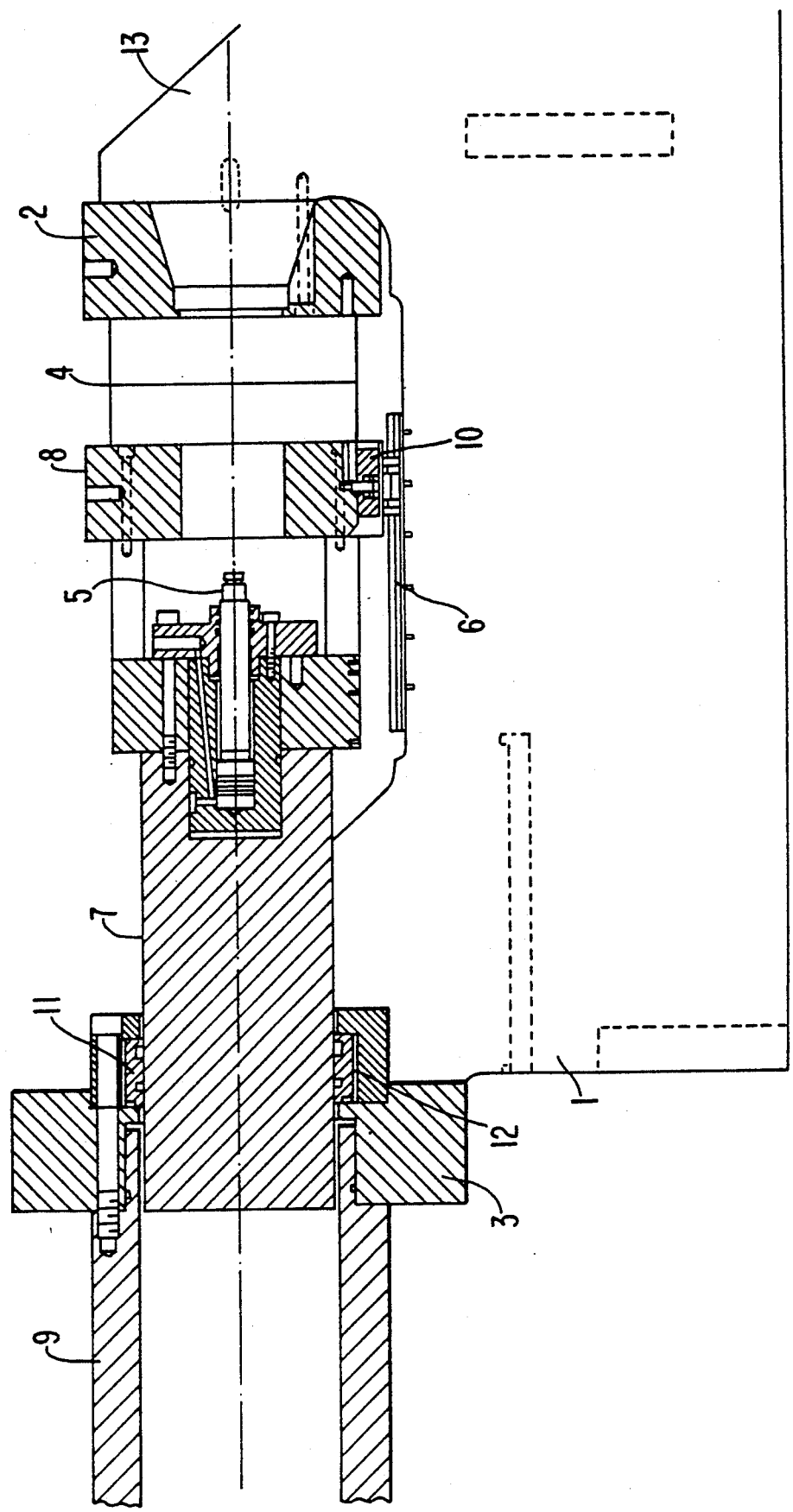

INJECTION MOLDING MACHINE INCLUDING LATERALLY DISPLACEABLE PISTON

BACKGROUND OF THE INVENTION

The invention relates to an injection molding machine having a machine frame, a stationary mold fixing plate, a movable mold fixing plate, and a cylinder plate which carries at least one piston-cylinder unit of a hydraulic or electromechanical closing mechanism. The cylinder plate on which the movable mold plate is supported and the stationary mold fixing plate are not connecting as is usual by beam members, but are connected exclusively by way of the machine frame. Under the influence of a mold closing force, the mold fixing plates which are locked together tilt slightly out of a plane extending perpendicularly to the machine frame.

Up to a few years ago, injection molding machines in which the closing force was carried by a U-shaped machine frame, without beam member preventing the frame from spreading apart, where unknown. A construction without beam members was used only in blow molding machines, which however have two movable mold fixing plates (see DE-C-20 48 258 and DE-C-23 21 694). In such a construction the mold separation plane is always disposed in the middle region of the frame and it will be clear that parallelism of the mold halves can be achieved by hingedly mounting each mold half on the associated part of the machine frame. In the case of injection molding machines however which have a stationary mold fixing plate and a movable mold fixing plate, although a publication dating from the year 1983 (see DE-A1-31 32 949) shows an arrangement without beam members, the problems which arise due to the omission of the beam members were neither mentioned nor overcome. That was first done by EP-B1-0 311 133. That publication states that, in the case of a machine of the type defined above, it is possible to control the closing forces which, in injection molding machines, are typically a hundred times greater than in blow molding apparatuses, even if only one mold fixing plate is movable. For that purpose it is necessary for the movable mold fixing plate to be arranged tiltably about a horizontal axis. In EP-B1-0 311 133, that arrangement is structurally embodied in that arranged in the piston of the piston-cylinder unit is a hinge pivot which, when the mold is closed, is in the middle region of the machine frame.

SUMMARY OF THE INVENTION

The object of the present invention is to simplify the construction in accordance with EP-B1-0 311 133.

The way in which that object is attained is based on the consideration that a hinge at the point of intersection of the central axes of the mold fixing plates on the one hand and the piston-cylinder unit on the other hand can be avoided if it is provided that the piston of the piston-cylinder unit, which piston is rigidly connected to the movable mold fixing plate, is pivotable relative to the cylinder of the piston-cylinder unit.

If there is no wish for the cylinder of the piston-cylinder unit to again be mounted hingedly itself, it is necessary in carrying the concept of the invention into effect to make a seal between the piston and the cylinder of the hydraulic unit radially displaceable.

BRIEF DESCRIPTION OF THE DRAWING

Further features of the invention will be described hereinafter with reference to the accompanying drawing which is a sectional side view of a closing side of an injection molding machine.

DETAILED DESCRIPTION OF THE INVENTION

The illustrated injection molding machine for plastic material has a machine frame 1 on which on the one hand a stationary mold fixing plate 2 and on the other hand a cylinder plate 3 are fixedly arranged. Disposed between the plates 2 and 3 is a closing means for a tool or mold 4 which consists of two halves. The closing means includes in particular a piston 7 which is slidable axially in a cylinder 9 and which moves a movable mold fixing plate 8 with a reciprocating motion along a rectilinear guide bar or rail 6, and generates the necessary mold closing pressure. A hydraulically actuated ejector 5 makes it possible for an object produced in the mold 4 to be removed from the mold after opening thereof that is to say after movement of the movable mold fixing plate 8 towards the left as shown in the drawing.

The drawing does not show the injection side of the machine, in particular a screw piston which in the usual fashion introduces plasticized plastic material into the mold 4 through the stationary mold fixing plate 2.

When the plastic material is injected into the mold 4, considerable forces act in the direction of causing opening of the mold 4. Such opening must therefore be prevented by means of a high pressure in the interior of the cylinder 9. That pressure is typically of the order of magnitude of 500 bars. The forces which thus act between the cylinder 9 or the cylinder plate 3 on the one hand and the stationary mold fixing plate 2 on the other hand cause the plates 2 and 3 to be urged apart slightly but inevitably in a V-shape. In conventional injection molding machines that effect is prevented by beam members which close the flow of forces in the machine frame. However such beam members are precisely to be avoided in the type of machine to which the present invention is directed, as such beams severely reduce the accessibility of the mold 4.

So that the movable mold fixing plate 8 can also assume the slightly inclined position which the mold fixing plate 2 experiences when the mold closing pressure is applied by the piston 7, the piston 7 is mounted in the cylinder 9 in a particular fashion.

Firstly it is important that the end of the piston 7 can move slightly radially in the cylinder 9, i.e. transversely of the axis thereof, as the piston is of a plunger-like configuration. In order to prevent the hydraulic fluid which is under high pressure from flowing out of the cylinder 9, a seal 11 which forms the core of the invention must bear sealingly in the axial direction against walls of a recess 12 surrounding the seal. Likewise, slight angular positioning as between the axes of the piston 7 and of the cylinder 9 must not adversely affect the sealing contact of the seal 11 against the piston 7.

As the piston 7 is rigidly connected to the movable mold fixing plate 8, the end of the piston 7 is pivoted upwardly under the influence of the mold closing force. The seal 11 must also be involved in such pivotal movement, by radial displacement in the recess 12. Thus, the deformation of the machine frame 1 no longer has any influence on the mold 4 or the injection procedure.

In an upstanding limb portion 13 of the machine frame 1 and therewith the stationary mold fixing plate 2 are pivoted in the clockwise direction under the influence of the closing force, the movable mold fixing plate 8 which is locked to the mold fixing plate 2 can also perform such slight pivotal movement only if it can move away somewhat from guide rail or bar 6. That is achieved by virtue of the fact that, although the movable mold fixing plate 8 is restrained in the direction of the guide rail or bar 6 by a carriage 10 which is positively connected to the rail or bar 6, the mold fixing plate 8 can be lifted off the carriage 10.

I claim:

1. In an injection molding machine including a machine frame, a stationary mold fixing plate fixed to said machine frame, a cylinder plate fixed to said machine frame, a piston-cylinder unit carried by said cylinder plate and including a fixed cylinder having an axis and a piston axially movable relative to said cylinder in opposite rectilinear directions toward and away from said stationary mold fixing plate, a movable mold fixing plate carried by said piston for axial movement thereby to a mold closing position locked together with said stationary mold fixing plate, said cylinder plate and said stationary mold fixing plate being connected together exclusively by said machine frame such that a closing force generated by said piston-cylinder unit tilts said locked together mold fixing plates slightly out of a plane perpendicular to said axis, the improvement wherein:

said cylinder is rigidly connected to said machine frame by said cylinder plate; and said piston is rigidly connected to said movable mold fixing plate and is displaceable relative to said cylinder in a direction laterally to said axis thereof.

2. The improvement claimed in claim 1, further comprising a guide bar on said machine frame to guide said axial movement of said movable mold fixing plate, said movable mold fixing plate being displaceable laterally of said guide bar.

3. The improvement claimed in claim 1, further comprising a seal carried by said cylinder and bearing sealingly on said piston, said seal being retained in a recess and being displaceable therein laterally of said axis.

* * * * *